United States Patent [19]

Dorai

[11] Patent Number: 5,053,553

[45] Date of Patent: Oct. 1, 1991

[54] PROCESS FOR PREPARING A NARROW MOLECULAR WEIGHT DISTRIBUTION POLY (TETRAMETHYLENE ETHER) GLYCOL

[75] Inventor: Suriyanarayanan Dorai, Lockport, N.Y.

[73] Assignee: E. I. Du Pont de Nemours and Company, Wilmington, Del.

[21] Appl. No.: 550,101

[22] Filed: Jun. 25, 1990

Related U.S. Application Data

[63] Continuation of Ser. No. 246,290, Sep. 19, 1988, abandoned.

[51] Int. Cl.$^5$ .............................................. C07C 41/38
[52] U.S. Cl. ..................................... 568/617; 518/621

[58] Field of Search ................................ 568/617, 621

[56] References Cited

U.S. PATENT DOCUMENTS 3,478,109 11/1969 McConnell ......................... 568/621
4,762,951 8/1988 Mueller ............................... 568/617

Primary Examiner—Howard T. Mars

[57] ABSTRACT

A process for preparing a narrow molecular weight distribution poly(tetramethylene ether) glycol (PTMEG) from a PTMEG starting material via liquid-liquid extraction which employs methanol, water and non-polar solvent wherein the amount of non-polar solvent is, by weight, less than the PTMEG starting material.

7 Claims, 1 Drawing Sheet

PROCESS FOR PREPARING A NARROW MOLECULAR WEIGHT DISTRIBUTION POLY (TETRAMETHYLENE ETHER) GLYCOL

This application is a continuation of application Ser. No. 07/246,290 filed Sept. 19, 1988, abandoned.

FIELD OF THE INVENTION

Background of the Invention

The present invention relates to a process for preparing a narrow molecular weight distribution (NMWD) poly(tetramethylene ether) glycol (PTMEG), and, more particularly, to an improved batchwise liquid-liquid extraction process for preparing such PTMEG which employs a mixture of methanol and water along with an amount of cyclohexane which, by weight, is less than the PTMEG starting material.

Butylene terephthalic-based polyester elastomers derived from PTMEG are normally prepared in two stages which comprise transesterification and polycondensation. In the transesterification stage, butylene terephthalate (BT) and polyester glycol terephthalate are formed by reacting 1, 4 butanediol, PTMEG and dimethyl terephthalate using tertiary butyl titanate as catalyst. The polycondensation stage is the key step in the preparation, and homogeneity of the reaction mass is critical to the success of the process. For certain grades of polyester elastomers, particularly those grades which require using a low ratio of PTMEG to BT where the molecular weight of the PTMEG is greater than 1050, the reaction mass can separate into two phases which is highly undesirable.

A "Polyester Elastomer Melt-Phase Test" was developed which is useful in determining whether a given reaction mass will separate during polycondensation and from which information was obtained as to the effect of PTMEG quality on phase separation tendency. By mixing 43 to 50 parts by weight of 1, 4 butanediol with 75 parts by weight of dimethyl terephthalate and 15.96 parts by weight of the proposed PTMEG starting material, the reaction mass thus formed will conveniently indicate whether separation will occur.

To avoid phase separation in cases where a PTMEG starting material having a molecular weight greater than 1050 is needed, it was determined that the PTMEG must meet certain molecular weight distribution and dispersity limitations. The desired PTMEG starting material, therefore, should have a narrow molecular weight distribution wherein dispersity, also referred to as polydispersity, is less than 1.35 and molecular weight ratio is less than 1.65. A significant problem, which is solved by the improved process of this invention, has been how to obtain such a high molecular weight PTMEG which containes low concentrations of high molecular weight species.

Japanese Patent Application Tokukai 60-42421 (Mitsubishi) describes a process for preparing PTMEG of narrow molecular weight distribution in which a PTMEG having an average molecular weight of from 500 to 3000 is admixed with a mixed solvent comprising water and methanol. A much larger amount, i.e., greater than 1.2 times, of mixed solvent, having a water content in the range of 30–70% by weight based on total solvent, is used in proportion to PTMEG, in terms of weight ratio, to bring about separation of low molecular weight PTMEG. Separation is effected by the usual techniques for layer separation. While it is possible to obtain PTMEG of narrow molecular weight distribution according to this process, there is no information as to the concentration of high molecular weight species to be expected nor is there any suggestion as to the significance of such a concentration.

U.S. Pat. No. 3,478,109 describes a method for removing the lower molecular weight fraction of PTMEG from a PTMEG starting material. The PTMEG starting material is dissolved in a cycloaliphatic (cyclohexane) and/or aromatic solvent, and in an aqueous methanol solution which is used as the extracting solvent that removes the lower molecular weight fraction of PTMEG from the starting material. When the process is operated batchwise, the amount of cyclohexane present must be in excess, by weight, of the PTMEG starting material. There is no teaching, however, as to the concentration of high molecular weight species to be found in any fraction of the PTMEG or of the suitability of any PTMEG fraction having a molecular weight of at least 1050 for preparing butylene terephthalic-based polyester elastomers.

Japanese Patent Application No. 215111 (1983), published as Japanese Laid-Open No. 108424/1985 on June 13, 1985, describes a method for fractional precipitation of PTMEG having a sharp molecular weight distribution which comprises contacting a PTMEG starting material with water in the presence of methanol and/or ethanol. The amount of water needed is up to 1.7 times the amount of methanol, or up to 3.0 times the amount of ethanol, and the precipitation of the desired PTMEG fraction can be controlled with the amount of water present.

SUMMARY OF THE INVENTION

The present invention is an improved process for preparing PTMEG having a molecular weight between about 1300 and about 1600, and having a dispersity between about 1.30 and about 1.385. The process utilizes a starting material comprising PTMEG having an average molecular weight between about 800 and about 1200, and having a dispersity between about 1.5 and about 1.8.

An important aspect of the invention is the discovery of a molecular weight distribution parameter which is characteristic of the desired PTMEG which shall be referred to hereinafter as the Z factor. The Z factor is a ratio $M_z/M_n$ where $M_z$ refers to Z Average Molecular Weight, and $M_n$ refers to Number Average Molecular Weight. The desired PTMEG, i.e., PTMEG having a high molecular weight which contains low concentrations of high molecular weight species, can be characterized as having a Z factor of not higher than about 1.80, and preferably below 1.80.

The process of this invention comprises mixing the PTMEG starting material simultaneously with methanol, water and a non-polar solvent having a solubility parameter between about 7.30 and about 8.20. By mixing the non-polar solvent with the PTMEG starting material at a weight ratio between about 0.50 and 0.75, i.e., the PTMEG starting material is in excess, by weight, of the non-polar solvent, it is possible to obtain the desired PTMEG. In a preferred embodiment of this invention the non-polar solvent is cyclohexane which is mixed with the PTMEG starting material at a weight ratio, solvent to PTMEG starting material, of 0.55.

BRIEF DESCRIPTION OF THE DRAWING

The Figure is a simplified process flow diagram which illustrates the major components of the process of the invention and their interconnection.

DETAILED DESCRIPTION OF THE INVENTION

Figure 1:
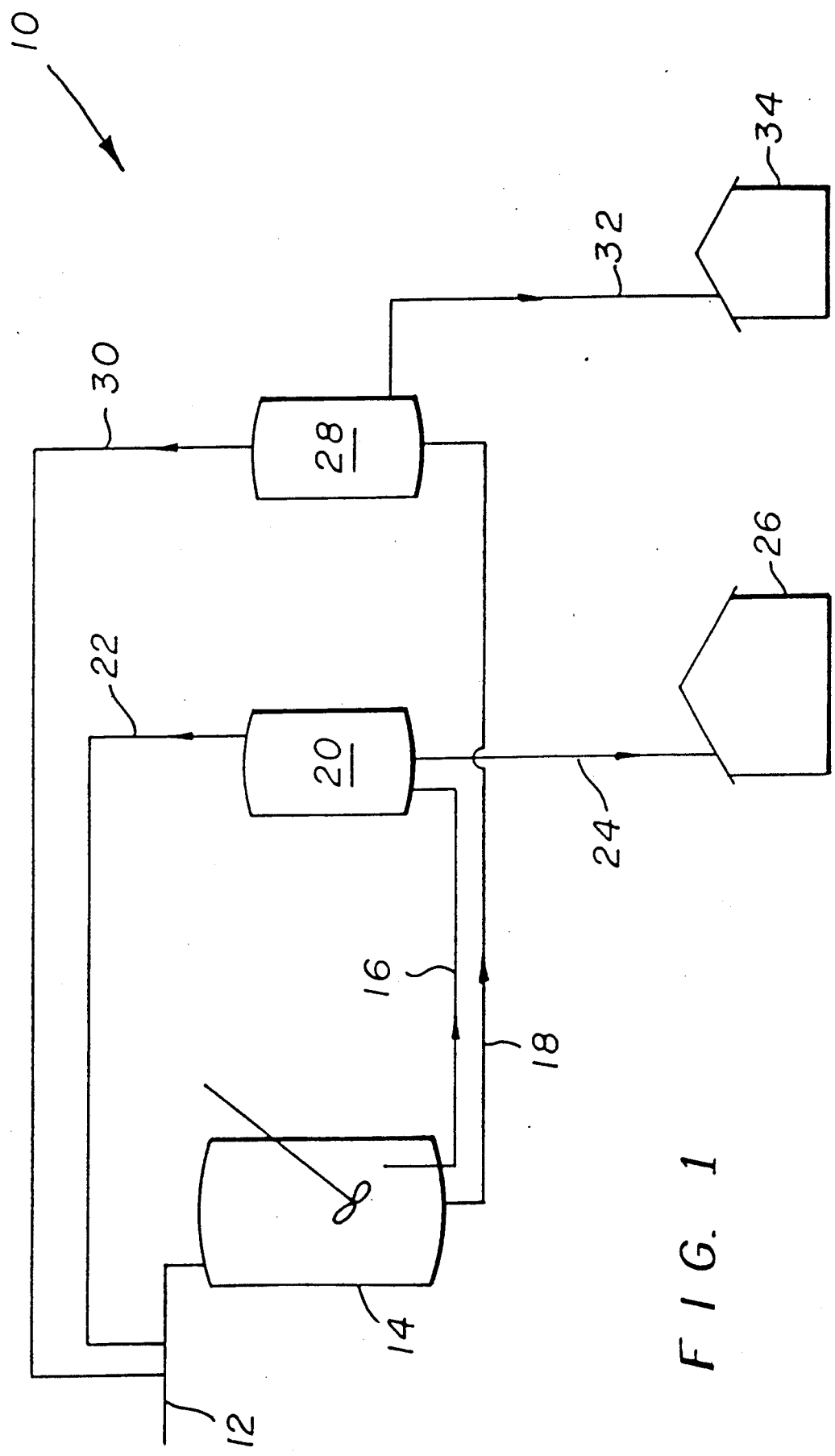

Certain terms, which are typical molecular weight distribution parameters and whose meanings are set out below, are used herein to describe the invention:

$$M_n = \frac{\text{Sum of } (W_i) \text{ for All } i \text{ Values}}{\text{Sum of } (W_i/M_i)} \quad \text{Number Average Molecular Weight } (M_n) \quad (1)$$

where:
$W_i$ is the weight of the ith polymer species/oligomer, and
$M_i$ is the molecular weight of the ith species/oligomer.

$$M_w = \frac{\text{Sum of } [(W_i)(M_i)] \text{ for All } i \text{ Values}}{\text{Sum of } (W_i) \text{ for All } i \text{ Values}} \quad \text{Weight Average Molecular Weight } (M_w)$$

Dispersity/Polydispersity ($M_w/M_n$)

Dispersity or polydispersity, used herein interchangably, is a universally accepted measure of molecular weight distribution. The lower the value of dispersity, the narrower is the molecular weight distribution for the PTMEG sample under consideration.

Molecular Weight Ratio (MWR)

$$MWR = 1160 n^{0.493}/M_n \ldots (2)$$

where:
n is melt viscosity in poise, and
$M_n$ is a number average molecular weight as defined in equation (1).

Solubility Parameter (SP)

SP = latent heat of vaporization/specific volume ½ ... (3)

SP is an empirical parameter which is a useful tool for predicting solubility. It is only an approximation and does not take into account, quantitatively, the intermolecular forces of attraction. Solvents having an SP less than about 8.0 are considered non-polar and are primarily subject to van der Waal's forces of attraction. Solvents having an SP greater than about 8.5 but less than about 11 are considered polar solvents and are subject to additional chemical forces of attraction. Hydrogen-bonding solvents, e.g., water and alcohol, have the highest SP. The greater the difference between the SP values of two solvents is, the more immiscible they are likely to be.

$$M_z = \frac{\text{Sum of } [W_i(M_i^2)] \text{ for All } i \text{ Values}}{\text{Sum of } [W_i(M_i)] \text{ for All } i \text{ Values}} \quad \text{Z Average Molecular Weight } (M_z)$$

A typical process for preparing PTMEG, and the process from which PTMEG samples were prepared to demonstrate the invention, involves a polymerization reaction which uses tetrahydrofuran (THF) as a starting material and fluosulfonic acid (FSA) as a polymerization catalyst. Such a process is described in more detail in U.S. Pat. No. 2,751,419, the teachings of which are incorporated herein by reference. The principal reaction product is the sulfate ester of PTMEG which is quenched with water to produce PTMEG. Molecular weight distribution properties from samples of PTMEG produced from the above process are shown in Table 1.

TABLE 1

Molecular Weight Distribution Parameters of Commercially Produced PTMEG

| PTMEG Source | PTMEG Number Average Molecular Weight ($M_n$) | PTMEG Molecular Weight Ratio (MWR) | PTMEG Poly Dispersity ($M_w/M_n$) | PTMEG Z Factor ($M_z/M_n$) |
|---|---|---|---|---|
| 1. Virgin Batch | 850–1000 | 1.98–2.03 | 1.65–1.8 | 2.0–2.25 |
| 2. Virgin Batch | 1350–1450 | 1.98–2.03 | 1.65–1.6 | 2.0–2.35 |
| 2. Typical commercial lot (obtained by blending of either Virgin Batches or off-spec material) | 850–1000 | 1.98–2.03 | 1.65–1.8 | 2.25–2.6 |

Z Factor

Traditional molecular weight distribution parameters have not been helpful in defining or characterizing PTMEG blends of varying molecular weights within a narrow range. A new parameter, defined above as the ratio $M_z/M_n$ and referred to herein as the Z factor, has been discovered which is particularly useful in such a characterization. The higher the Z factor, the higher is the concentration of high molecular weight species within a PTMEG blend.

The PTMEG samples shown in Table 1 were subjected to the "Polyester Elastomer Melt-Phase Test", and the results are shown in Table 2.

TABLE 2

| PTMEG Raw Material | Melt Phase Test Results |
|---|---|
| Sample 1 Virgin Batch Mn = 850–1000 | Clear Melt - Test passed; and no phase separation; PTMEG is suitable for elastomer production. |
| Sample 2 Virgin Batch Mn = 1350–1450 | Turbid Polycondensation Product; Test failed; PTMEG is not suitable for elastomer production. |
| Sample 3 Blended Batch Mn = 850–1000 | Test passed some times only |

From the results shown in Table 2, relatively high molecular weight PTMEG (i.e., Sample 2 wherein Mn > 1300) forms a turbid reaction mixture which makes it unsuitable as a raw material in the preparation of polyester elastomers. Sample 3, derived from blending PTMEG from various commercial sources, would also be unacceptable because, although the value of Mn ranged from 850 to 1000, the sample did not consistently pass the Melt Phase Test.

High molecular weight PTMEG (Mn > 1300) samples were prepared from PTMEG sources 1 and 3 of Table 1, above, by either solvent extraction (as described in U.S. Pat. No. 3,478,109) or by depolymerization (as described in U.S. Pat. No. 3,925,484) to produce a narrow molecular weight distribution (NMWD) PTMEG which would consistently pass the Melt Phase Test. The number average molecular weight of the NMWD PTMEG samples averaged between about 1300 and 1410. The results of the Melt Phase Test and the molecular weight distribution parameters recorded for the samples can be seen in Table 3.

TABLE 3

| PTMEG Source | $M_n$ | $M_w/M_n$ | MWR | Z Factor | Results |
|---|---|---|---|---|---|
| 1. Virgin Batch | 1337 | 1.33 | 1.63 | 1.72 | Passed |
| 2. Partially (60%) Virgin Batch | 1345 | 1.35 | 1.61 | 1.78 | Passed |
| 3. Virgin Batch | 1369 | 1.33 | 1.61 | 1.71 | Passed |
| 4. Mostly Virgin Batch | 1365 | 1.35 | 1.62 | 1.78 | Passed |
| 5. Two Virgin Batches, Blended Together | 1405 | 1.34 | 1.60 | 1.77 | Passed |
| 6. Severely Blended Batch | 1407 | 1.37 | 1.63 | 1.85 | Failed |
| 7. 50% of 1 + 50% of 6 (by weight) | 1371 | 1.35 | 1.63 | 1.79 | Passed |
| 8. 25% of 1 + 75% of 6 (by weight) | 1389 | 1.36 | 1.63 | 1.82 | Failed |
| 9. 35% of 1 + 65% of 6 (by weight) | 1382 | 1.35 | 1.63 | 1.81 | Failed |
| 10. Mostly Virgin Batch | 1403 | 1.35 | 1.62 | 1.79 | Passed |

From the results shown in Table 3, high molecular weight PTMEG having a Z factor of 1.80 or below and a dispersity/polydispersity between about 1.30 and about 1.385 will consistently pass the Melt Phase Test and, thus, be suitable for preparing polyester elastomers.

Referring to the Figure, there is shown a simplified process flow diagram 10 which illustrates the major components which are ordinarily employed in practicing the invention and their interconnection. The flow diagram 10 is merely exemplary and is not intended to preclude variations of the process which embrace the inventive features described herein.

The present invention is a process known generally as a liquid-liquid extraction process which is conducted in a batchwise manner. General knowledge of batchwise liquid-liquid extraction is assumed, but additional insight may be gained by referring to Section 15 of Perry's 5th ed. of the *Chemical Engineer's Handbook*, the teachings of which are incorporated herein by reference.

Feed line 12, which communicates with an agitated extractor/decanter vessel 14, introduces the raw materials, such as the PTMEG starting material, the non-polar solvent, the methanol and the water, into vessel 14. Preferably, vessel 14 is purged of ambient atmosphere and the extraction is performed in an inert atmosphere, such as a nitrogen atmosphere. After all materials have been charged into vessel 14, they are simultaneously mixed thoroughly and heated to a temperature between about 45° C. and 50° C. In a preferred embodiment of the process the reaction medium is heated to a temperature of about 50° C.

After mixing, the contents of vessel 14 are allowed to settle for at least 15 minutes and preferably up to 60 minutes. Two substantially immiscible liquid phases are formed, the top phase comprising PTMEG of the desired narrow molecular weight distribution dissolved in non-polar solvent, and the bottom phase comprising the remaining PTMEG dissolved in the mixture of methanol and water. The two phases can be separated in a conventional manner, such as, for example, by decanting or by pumping out the bottom phase via line 18 and then decanting or pumping out the top phase via line 16. The bottom phase is transferred to a bottom phase boiler 28, and the top phase is transferred to a top phase boiler 20.

The desired PTMEG and the non-polar solvent are separated, in the top phase boiler 20, preferably by heating the top phase in a nitrogen atmosphere to boil off the solvent. When the top phase reaches a temperature of about 135° C., a vacuum of less than about 6 mm Hg is pulled, and heating is continued until the solvent is removed. Preferably, the evaporated solvent is condensed and recycled to vessel 14 via line 22. The desired PTMEG, transferred via line 24, is stored in a tank 26.

The bottom phase, comprising the remaining PTMEG and the mixture of methanol and water, is heated to boil off the methanol. Preferably, the vessel is heated to about 95° C. to drive off the methanol, and then the evaporated methanol is condensed and recycled to vessel 14 via line 30.

After the methanol is removed, heating is discontinued and the contents, i.e., remaining PTMEG and water, of vessel 28 are allowed to settle. Two phases will be formed: the top phase comprising the PTMEG and the bottom phase comprising water. The water is decanted from or pumped out of the vessel and can be recycled to vessel 14 via line 30. Thereafter, the remaining PTMEG is dried at a temperature of 150° C. under a nitrogen atmosphere and at a pressure of under 6 mm Hg. The remaining PTMEG is then transferred via line 32 for storage in tank 34.

The PTMEG starting material has an average molecular weight between about 800 and about 1200 and has a dispersity between about 1.5 and 1.8. In a preferred embodiment of this invention, the PTMEG starting material has an average molecular weight between about 880 and about 980, and a dispersity between about 1.5 and 1.65.

The preferred non-polar solvent for practicing the process of this invention is cyclohexane, although any other non-polar solvent having a solubility parameter between 7.30 and 8.20 will produce satisfactory results. Representative examples are shown in Table 4. The following solvents are exemplary of those having the requisite solubility parameter: cyclohexane, hexane, heptane, hexadecane, cyclopentane, methyl-cyclohexane, methyl-cyclopentane, and mixtures thereof. The PTMEG starting material is present in the reaction medium in an amount which is in excess, by weight, of the amount of non-polar solvent. In a preferred embodiment of this process, the non-polar solvent is mixed with the PTMEG starting material at a weight ratio, solvent to PTMEG starting material, of 0.55. This ratio may be less than 0.75, or between about 0.50 and 0.75, or between about 0.50 and about 0.55.

TABLE 4

| Solvents | Temperature Centigrade | Solubility Parameter (SP) |
|---|---|---|
| n-Hexane | 25 | 7.30 |
| n-Heptane | 25 | 7.45 |
| n-Octane | 25 | 7.55 |

TABLE 4-continued

| Solvents | Temperature Centigrade | Solubility Parameter (SP) |
|---|---|---|
| n-Nonane | 25 | 7.65 |
| Methyl-cyclohexane | 25 | 7.85 |
| n-Hexadecane | 25 | 8.00 |
| Methyl-cyclopentane | 25 | 8.00 |
| Cyclopentane | 25 | 8.10 |
| Cyclohexane | 25 | 8.20 |

Methanol appears to be the only alcohol which can be used in this process; ethanol and n-propanol have been tried and are not effective. The water employed in the process is not distilled and preferably contains trace amounts of inorganic cations, the dissolution product of $MgSO_4$, $Na_2SO_4$, $Na_2CO_3$, $CaSO_4$. "Trace amounts", as the term is used herein, refers to an amount on the same order of magnitude as found in ordinary tap water. The inorganic cations are necessary to prevent the mixture of the PTMEG starting material, the non-polar solvent, and the mixture of methanol and water from emulsifying during the initial reaction step. Periodically, it will be necessary to add these cations to the recycled water. The weight ratio of methanol to water is between 1.50 and about 3.00, and preferably is about 1.52.

The ratio, by weight, of PTMEG starting material and non-polar solvent to methanol and water is preferably 0.47, although the ratio can be in the range of 0.45 to about 0.65 and produce satisfactory results.

The desired PTMEG obtained from the process of this invention has an average molecular weight between about 1300 and about 1600, a dispersity between about 1.30 and 1.385, and the value of the Z factor is 1.80 or below. Most desirably, the PTMEG obtained from the process of this invention has an average molecular weight between 1300 and 1500, a dispersity between 1.30 and 1.38, and the Z factor is below 1.80.

EXAMPLE 1

250 grams of PTMEG starting material having an average molecular weight of 883 and having a dispersity of 1.64 (MWR of 2.08) were mixed with 500 grams of methanol, 138 grams of cyclohexane and 330 grams of water. The contents were thoroughly mixed and heated to 50° C. The contents were allowed to settle for one hour. The top phase was decanted from the bottom phase and the desired PTMEG was separated therefrom by distilling off the cyclohexane. About 165 grams of desired PTMEG were recovered and had an average molecular weight of 1350, a dispersity of 1.353 and a MWR of 1.63. The value of the Z factor was 1.78.

EXAMPLE 2

7.17 grams of PTMEG starting material having an average molecular weight of 929 and having a dispersity of 1.59 (MWR 2.0) were mixed with 14.34 grams of methanol, 3.94 grams of cyclohexane and 9.46 grams of water. The contents were thoroughly mixed and heated to 50° C., then allowed to settle. One hour later two phases were formed and then separated as described in Example 1. About 5 grams of desired PTMEG were recovered from the top phase and had an average molecular weight of 1341 and a dispersity of 1.34. The value of the Z factor was 1.71. About 2.03 grams of remaining PTMEG awere recovered from the bottom phase and had an average molecular weight of 542 and a disperity of 1.34.

EXAMPLE 3

250 grams of PTMEG starting material having a average molecular weight of 971 and having a dispersity of 1.643 (MWR 2.00) were thoroughly mixed with 138 grams of cyclohexane, 500 grams of methanol and 330 grams of water. The mixture was then allowed to settle at 50° C. for 60 minutes. About 163 grams of desired PTMEG were recovered from the top phase and had an average molecular weight of 1408, a dispersity of 1.37 and a MWR of 1.63. The value of the Z Factor was 1.85 (this COMPARATIVE EXAMPLE essentially corresponds to item 6 in TABLE 3).

COMPARATIVE EXAMPLE 4

7.17 grams of PTMEG starting material having an average molecular weight of 929 and a dispersity of 1.587 (MWR 2.00) were mixed with 14.35 grams of ethanol, 3.94 grams of cyclohexane and 9.50 grams of water. The mixture was allowed to settle at 50° C. for 60 minutes. The desired PTMEG obtained from the top phase had an average molecular weight of 1236 and a dispersity of 1.395. The value of the Z factor was 1.84.

The following Examples, shown in Table 5, were performed under conditions as set forth above, i.e., extracted at 50° C. and allowed to separate for one hour after thorough mixing. The first three Examples correspond to Examples 1-3 above and the first Example under "Comparative Examples" corresponds to Comparative Example 4 above. By following the process of this invention, PTMEG having the desired average molecular weight, dispersity, and the desired value of the Z factor can be obtained.

The present invention may be embodied in other specific forms without departing from the spirit or essential attributes thereof and, accordingly, reference should be made to the appended Claims, rather than to the foregoing specification, as indicating the scope of the invention.

TABLE 5

| | Starting Material PTMEG | | A PTMEG | B cycl. | C MeOH | D H2O | Desired PTMEG | | Ratios | | |
|---|---|---|---|---|---|---|---|---|---|---|---|
| | Mn | Disp. | gr | gr | gr | gr | Mn | Disp. | B/A | C/D | A + B/C + D |
| Example | | | | | | | | | | | |
| 1 | 883 | 1.64 | 250 | 138 | 500 | 330 | 1350 | 1.353 | 0.55 | 1.52 | 0.47 |
| 2 | 929 | 1.59 | 7.17 | 3.94 | 14.34 | 9.46 | 1341 | 1.34 | 0.55 | 1.52 | 0.47 |
| 3 | 971 | 1.643 | 250 | 138 | 500 | 330 | 1408 | 1.37 | 0.55 | 1.52 | 0.47 |
| 4 | 969 | 1.59 | 10.06 | 5.05 | 20.15 | 8.65 | 1508 | 1.375 | 0.50 | 2.33 | 0.61 |
| 5 | 969 | 1.59 | 9.13 | 6.85 | 18.26 | 7.87 | 1556 | 1.355 | 0.75 | 2.32 | 0.61 |
| 6 | 969 | 1.59 | 10.00 | 5.01 | 20.00 | 13.35 | 1410 | 1.364 | 0.50 | 1.50 | 0.45 |
| 7 | 889 | 1.59 | 10.03 | 5.00 | 20.06 | 8.60 | 1493 | 1.353 | 0.50 | 2.33 | 0.52 |
| 8 | 889 | 1.59 | 10.25 | 5.13 | 20.07 | 6.69 | 1579 | 1.385 | 0.50 | 3.00 | 0.30 |

TABLE 5-continued

|   | Starting Material PTMEG | | A PTMEG | B cycl. | C MeOH | D $H_2O$ | Desired PTMEG | | Ratios | | |
|---|---|---|---|---|---|---|---|---|---|---|---|
|   | Mn | Disp. | gr | gr | gr | gr | Mn | Disp. | B/A | C/D | A + B/C + D |
| 9 | 889 | 1.59 | 10.00 | 5.01 | 20.00 | 10.76 | 1416 | 1.351 | 0.50 | 1.86 | 0.49 |
| 10 | 889 | 1.59 | 10.04 | 5.01 | 20.08 | 13.39 | 1350 | 1.353 | 0.50 | 1.50 | 0.64 |
| 11 | 886 | 1.64 | 7.17 | 3.94 | 14.34 | 9.46 | 1342 | 1.352 | 0.55 | 1.52 | 0.47 |
| Comparative Examples | | | | | | | | | | | |
| 12 (4) | 929 | 1.587 | 7.17 | 3.94 | 14.35[1/] | 3.94 | 1236 | 1.395 | 0.55 | 3.64 | 0.61 |
| 13 | 969 | 1.59 | 6.84 | 6.84 | 6.84 | 2.94 | 1339 | 1.416 | 1.00 | 2.33 | 1.40 |
| 14 | 969 | 1.59 | 5.03 | 5.04 | 7.55 | 3.24 | 1491 | 1.414 | 1.00 | 2.33 | 0.93 |
| 15 | 969 | 1.59 | 5.02 | 5.00 | 10.00 | 4.32 | 1531 | 1.346 | 1.00 | 2.31 | 1.16 |
| 16 | 969 | 1.59 | 3.10 | 4.65 | 4.66 | 2.00 | 1804 | 1.496 | 1.50 | 2.33 | 0.87 |
| 17 | 969 | 1.59 | 4.16 | 6.24 | 8.38 | 3.59 | 1764 | 1.502 | 1.50 | 1.17 | 1.05 |
| 18 | 969 | 1.59 | 3.42 | 6.84 | 6.85 | 2.93 | 1776 | 1.483 | 2.00 | 2.34 | 0.54 |
| 19 | 929 | 1.59 | 7.17 | 0.00 | 14.34 | 9.51 | 1339 | 1.476 | 0.00 | 1.51 | 0.30 |

[1/]Ethanol substituted for methanol.

I claim:

1. A process for preparing narrow molecular weight poly(tetramethylene ether) glycol (PTMEG) having a number average molecular weight between about 1300 and about 1600, a dispersity between about 1.30 and 1.385, and a Z factor equal to or less than 1.80 which comprises:
   (a) providing a PTMEG starting material having a number average molecular weight between about 800 and 1200 and having a dispersity between about 1.5 and about 1.8;
   (b) mixing said PTMEG starting material with a mixture of methanol, water and a non-polar solvent having a solubility parameter between about 7.30 and about 8.20, the PTMEG starting material being in excess, by weight, of the non-polar solvent, and allowing the mixture to settle so as to form two substantially immiscible liquid phases, the top phase comprising PTMEG of the desired narrow molecular weight distribution dissolved in the non-polar solvent, and the bottom phase comprising the remaining PTMEG dissolved in the mixture of methanol and water;
   (c) separating the desired PTMEG from said two phase system; said Z factor being equal to the ratio:

$$M_z/M_n$$

wherein
$M_z$ is equal to the sum of $[W_i(M_i^2)]$ for all i values divided by the sum of $[W_i(M_i)]$ for all i values;
$M_n$ is equal to the sum of $(W_i)$ for all i values divided by the sum of $(W_i/M_i)$;
$w_i$ is the weight of the ith polymer species/oligomer, and
$M_i$ is the molecular weight of the ith species/oligomer.

2. The process of claim 1 wherein said PTMEG starting material is mixed simultaneously with the mixture of methanol and water and the non-polar solvent and then the reaction medium is heated to a temperature of from 45° to 50° C. and allowed to settle for one hour.

3. The process of claim 1 in which the non-polar solvent is cyclohexane which is mixed with the PTMEG starting material at a weight ratio, solvent to PTMEG starting material, between about 0.75 and 0.50.

4. The process of claim 3 in which the cyclohexane is mixed with the PTMEG starting material at a weight ratio, solvent to PTMEG starting material, of 0.55.

5. The process of claim 1, claim 2, claim 3, claim 4 or claim 6 in which the water contains a trace amount of inorganic cations and the weight ratio of methanol to water is between about 1.50 and about 3.00.

6. The process of claim 2 in which the non-polar solvent is cyclohexane which is mixed with the PTMEG starting material at a weight ratio, solvent to PTMEG starting material, between about 0.75 and 0.50.

7. The process of claim 5 wherein said PTMEG starting material has a number average molecular weight between about 880 and about 980 and a dispersity between about 1.5 and 1.65.

* * * * *